United States Patent
Throop

[15] 3,674,778
[45] July 4, 1972

[54] PREPARATION OF 9,11-DICHLORO STEROIDS

[72] Inventor: Lewis J. Throop, Los Altos, Calif.
[73] Assignee: Syntex Corporation, Panama, Panama
[22] Filed: Feb. 16, 1970
[21] Appl. No.: 11,877

[52] U.S. Cl. ................................260/239.55 D, 260/397.45
[51] Int. Cl. .......................................................C07c 173/00
[58] Field of Search ..................../Machine Searched Steroids Primary Examiner—Henry A. French
Attorney—Evelyn K. Merker, Gerard A. Blaufarb and Walter H. Dreger

[57] ABSTRACT

A process for preparing 9,11-dichloro steroids which involves the step of treating a 9α-unsubstituted-11β-hydroxy steroid with sulfuryl chloride optionally in inert liquid reaction media containing a tertiary amine. The 9,11-dichloro steroid products are known, useful anti-inflammatory agents.

10 Claims, No Drawings

PREPARATION OF 9,11-DICHLORO STEROIDS

The present invention relates to advances in organic process chemistry. More particularly, the present invention is directed to a new one step method useful for preparing 9,11-dichloro steroids which are known, useful anti-inflammatory agents.

Heretofore, 9,11-dichloro steroids have been prepared by procedures requiring several steps. One involves esterifying a 11β-hydroxy compound, eliminating the ester to form the corresponding $\Delta^{9(11)}$ compound, and finally dihalogenating the $\Delta^{9(11)}$ double bond. Another even more involved procedure proceeds from the 9,11-oxido compound, thence to the 9α-chloro-11β-hydroxy compound, thence the 9α-chloro-11-keto compound, thence to the 9α-chloro-11α-hydroxy compound, thence to a 9α-chloro-11α-ester, and thence to the 9α,11β-dichloro compound, the latter chlorination-replacement occurring with configurational inversion. These and other involved methods possess the disadvantages of several steps, several seemingly circuitous.

Now it has been discovered that 9α,11β-dichloro steroids can be prepared in a single step from 9α-unsubstituted-11β-hydroxy starting compounds. The process of the present invention consists essentially of the step of reacting a 9α-unsubstituted-11β-hydroxy steroid with sulfuryl chloride to prepare the corresponding 9α,11β-dichloro steroid. In accordance with this invention, therefore, 9α,11β-dichloro compounds are prepared from 9α-unsubstituted-11β-hydroxy compounds in a single step. This process can be depicted by the following equation of steroid partial formulas:

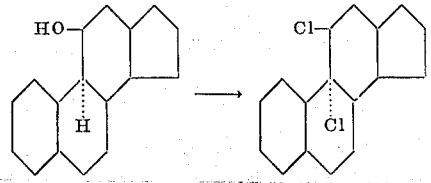

In the practice of the process of the present invention, a 9α-unsubstituted-11β-hydroxy steroid is reacted together with sulfuryl chloride. The reaction is optionally but preferably conducted in inert liquid reaction media. The reaction is further optionally conducted in the presence of tertiary amine. The reaction is further conducted at temperatures ranging from about −20° C. or less to about 50° C. or more, preferably −10° C. to about 30° C. and for a period of time ranging from about 30 minutes or less to about 24 hours or more. Higher or lower temperatures and/or longer reaction times can be employed depending upon choice of substrate, liquid reaction media (if any), tertiary amine (if any), and other, physical characteristics which may be employed such as stirring, use of pressure whether super or sub atmospheric. In general, these equivalent modifications are within the usual and ordinary skill in the art and, as such, as included within the scope hereof.

Suitable inert, liquid reaction media, if employed, are provided by halogenated hydrocarbons such as methylene chloride, chloroform, and carbon tetrachloride; ethers such as tetrahydrofuran, diethyl ether, and dioxane; sulfoxides such as dimethylsulfoxide, diethylsulfoxide, and tetramethylenesulfoxide; carboxylic acids such as acetic acid, trifluoroacetic acid and the trimethylacetic acid; or suitable mixtures of one or more of the foregoing.

Suitable tertiary amines, if employed, are provided by pyridine, dimethylaniline, lutidine, collidine, trimethylamine, triethylamine, and the like, or suitable mixtures of one or more of the foregoing.

In the preferred embodiments hereof, the reaction is practiced with the benefit of each of an inert, liquid reaction media and a tertiary amine. In these embodiments, halogenated hydrocarbons and pyridine are respectively preferred.

The reaction consumes the reactants upon the basis of one mole of 9α-unsubstituted-11β-hydroxy starting steroid per mole of sulfuryl chloride. However, the amounts of the reactants to be employed are not critical, some of the desired 9α,11β-dichloro steroid product being obtained when employing any proportions thereof. In the preferred embodiments, the reaction is conducted by reacting from about 0.9 to about 5.0 moles or more of sulfuryl chloride per mole of starting steroid; the tertiary amine is employed in amounts ranging from about 1 to 100 or more moles per mole of starting steroid; and the inert liquid reaction media in solvent amounts.

In the practice of the process step, the reactants are contacted and maintained together in any convenient order or fashion and within the given temperature range for a period of time sufficient to produce product. Following reaction, the product can be separated and isolated via any conventional technique such as decantation, filtration, extraction, evaporation, distillation, and chromatography.

In one preferred embodiment, the sulfuryl chloride is dispersed in inert liquid reaction media and the resultant mixture then added to a mixture of starting steroid dispersed in the same or different inert liquid reaction media and tertiary amine.

The present invention is useful for the preparation of 9α,11β-dichloro steroids generally. The 9α,11β-dichloro steroid products hereof are known compounds useful as anti-inflammatory agents. In a particularly preferred embodiment, the present invention is useful for the preparation of 9α,11β-dichloro steroids of the following Formula

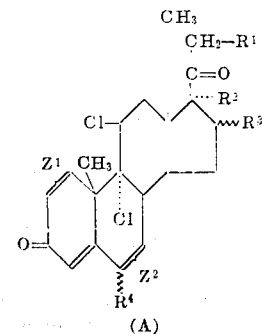

(A)

wherein R¹ is hydroxy or the conventional hydrolyzable esters thereof, bromo, chloro, or fluoro;

R² is hydroxy or the conventional hydrolyzable esters thereof;

R³ is α-methyl, β-methyl, methylene, hydroxy or the conventional hydrolyzable esters thereof, or, when taken together with R² the group

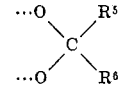

in which each of R⁵ and R⁶ is hydrogen, lower alkyl, monocyclic cycloalkyl, or monocyclic aryl;

R⁴ is hydrogen, methyl, chloro, or fluoro; and each of Z¹ and Z² is a carbon-carbon single bond or a carbon-carbon double bond.

The compounds of the present invention particularly as depicted by Formula (A) are anti-inflammatory agents useful in the treatment of contact dermatitis, arthritis, and so forth. As such, they can be used, in accordance with the ordinary skills of the art, in the same manner as other known anti-inflammatory agents, such as fluocinolone acetonide.

The starting 9α-unsubstituted-11β-hydroxy steroids preferably contain the desired elaborative groups at the other sites of the molecule. However, these optional elaborative groups may be introduced, if desired, after the principal process hereof. Thus, the process of the present invention can be practiced upon elaborated starting compounds or starting compounds capable of further elaboration after the principal reaction, particularly in accordance with the scope of the compounds depicted by Formula (A) above. In the preferred embodiments, $\Delta^6$ unsaturation is introduced after the principal reaction hereof such as with chloranil. Similarly, hydroxy groups other than the 11β-hydroxyl are suitably protected during the principal reaction hereof such as by forming a conventional ester thereof. When employing a 9α-unsubstituted-11β,21-dihydroxy starting compound, for example, the 9α,11β,21-trichloro product is prepared.

The starting 9α-unsubstituted-11β-hydroxy starting compounds are known and can be prepared via methods known per se.

The term "conventional hydrolyzable esters," as used herein refers to those hydrolyzable carboxylic ester groups conventionally employed in the synthetic hormone art such as those derived from hydrocarbon carboxylic acids. These hydrolyzable carboxylic esters are derived from both substituted and unsubstituted hydrocarbon carboxylic acids. These acids can be completely saturated or possess varying degrees of unsaturation (including aromatic), can be of straight chain, branched chain, or cyclic structure, and preferably contain from one to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus included are acetate, propionate, butyrate, valerate, caproate, enanthate, caprylate, pelargonate, acrylate, undecanoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-β,β-dimethylglutarate, acetoxyacetate, 2-chloro-4-nitrobenzoate, aminoacetate, diethylaminoacetate, piperidinoacetate, β-chloropropionate, trichloroacetate, β-chlorobutyrate, and the like.

The term "lower alkyl" as used herein denotes methyl, ethyl, propyl, butyl, pentyl, hexyl, the various isomers thereof. The term monocyclic cycloalkyl denotes cyclopentyl and cyclohexyl. The term "monocyclic aryl" denotes phenyl and substituted phenyl such as p-methylphenyl.

The following examples are provided to illustrate the present invention. As such, however, they should be construed merely as illustrative and not as limitative upon the overall scope hereof.

EXAMPLE 1

Sulfuryl chloride (6.7 grams) is dispersed in 250 ml. of chloroform at room temperature. A steroidal solution is prepared at room temperature by dispersing 6α-fluoro-16α,17α-isopropylidenedioxy-21-acetoxypregna-1,4-dien-11β-ol-3,20-dione (23.8 grams) in 100 ml. of methylene chloride and then cooled to 0° C. The sulfuryl chloride, chloroform mixture is then added to the cooled steroidal solution in a portion-wise fashion with stirring. After the addition, the resultant reaction mixture is maintained to 0° C. for 5 hours. After this time, the reaction mixture is washed with dilute hydrochloric acid and then water to a neutral pH. The washed mixture is then dried over sodium sulfate and the dried mixture evaporated to provide the 6α-fluoro-9α,11β-dichloro-16α,17α-isopropylidenedioxy-21-acetoxypregna-1,4-diene-3,20-dione product which can be further purified by recrystallization from methylene chloride/hexane.

EXAMPLE 2

One molar equivalent of sulfuryl chloride is dissolved in 1 liter of chloroform at room temperature. Ten millimoles of 6α-fluoro-16α,17α-isopropylidenedioxypregna-1,4-diene-11β,21-diol-3,20-dione is dispersed in 100 ml. of chloroform containing 10 ml. of triethyl amine at room temperature. To the resultant steroidal mixture is added 10 ml. of the sulfuryl chloride, chloroform mixture at room temperature at a portionwise fashion with stirring. The resultant reaction mixture is cooled to and maintained at 0° C. for one hour while stirring. After this period of time, it is washed with dilute hydrochloric acid and then repeatedly with water to neutrality. The washed mixture is dried over sodium sulfate and evaporated to provide the 6α-fluoro-9α,11β,21-trichloro-16α,17α-isopropylidenedioxypregna-1,4-diene-3,20-dione product which can be further purified by recrystallization from acetone/hexane.

EXAMPLE 3

The procedure of Example 2 is repeated, with similar results, employing carbon tetrachloride and lutidine in the preparation of the steroidal mixture in lieu of chloroform and triethyl amine. In addition, the reaction is conducted at 30° C. for a period of 30 minutes.

EXAMPLE 4

The procedure of Example 2 is repeated in the absence of tertiary amine, with similar results.

EXAMPLE 5

The procedure of Example 2 is repeated in the absence of chloroform, with similar results.

EXAMPLE 6

The procedure of Example 4 is repeated in the absence of chloroform, with similar results.

EXAMPLE 7

The procedure of Example 2 is repeated using, in addition to chloroform, one of dioxane, tetrahydrofuran, and acetic acid, with similar results in each instance.

EXAMPLE 8 TO 30

In accordance with the foregoing methods the starting compounds listed in Column B below are treated with sulfuryl chloride to respectively provide the products listed in Column C below.

| Column B | Column C |
|---|---|
| 16α,17α-isopropylidenedioxy-21-chloropregna-1,4-dien-11β-ol-3,20-dione | 9α,11β,21-trichloro-16α,17α-isopropylidenedioxypregna-1,4-diene-3,20-dione |
| 6α-fluoro-16α,17α-isopropylidenedioxy-21-chloropregna-1,4-dien-11β-ol-3,20-dione | 6α-fluoro-9α,11β,21-trichloro-16α,17α-isopropylidenedioxypregna-1,4-diene-3,20-dione |
| 6α,21-dichloro-16α,17α-isopropylidenedioxypregna-1,4-dien-11β-ol-3,20-dione | 6α,9α,11β,21-tetrachloro-16α,17α-isopropylidenedioxypregna-1,4-diene-3,20-dione |
| 6α-chloro-16α,17α-isopropylidenedioxy-21-fluoropregna-1,4-dien-11β-ol-3,20-dione | 6α,9α,11β-trichloro-16α,17α-isopropylidenedioxy-21-fluoropregna-1,4-diene-3,20-dione |
| 6α,21-difluoro-16α,17α-isopropylidenedioxypregna-1,4-dien-11β-ol-3,20-dione | 6α,21-difluoro-9α,11β-dichloro-16α,17α-isopropylidenedioxypregna-1,4-diene-3,20-dione |
| 16α,17α-isopropylidenedioxy-21-fluoropregna-1,4-dien-11β-ol-3,20-dione | 9α,11β-dichloro-16α,17α-isopropylidenedioxy-21-fluoropregna-1,4-diene-3,20-dione |
| 16α-methyl-17α-acetoxypregna-1,4-diene-11β,21-diol-3,20-dione | 9α,11β,21-trichloro-16α-methyl-17α-acetoxypregna-1,4-diene-3,20-dione |
| 16α-methyl-17α,21-diacetoxypregna-1,4-dien-11β-ol-3,20-dione | 9α,11β-dichloro-16α-methyl-17α,21-diacetoxypregna-1,4-diene-3,20-dione |
| 6α-fluoro-16α-methyl-17α-acetoxypregna-1,4-diene-11β,21-diol-3,20-dione | 6α-fluoro-9α,11β,21-trichloro-16α,methyl-17α-acetoxypregna-1,4-diene-3,20-dione |
| 6α-fluoro-16α-methyl-17α,21-diacetoxypregna-1,4-dien-11β-ol-3,20-dione | 6α-fluoro-9α,11β-dichloro-16α-methyl-17α,21-diacetoxypregna-1,4-diene-3,20-dione |
| 6α-methyl-17α-acetoxypregna-1,4-diene-11β,21-diol-3,20-dione | 6α-methyl-9α,11β,21-trichloro-17α-acetoxypregna-1,4-diene-3,20-dione |
| 6α-methyl-17α,21-diacetoxy- | 6α-methyl-9α,11β-dichloro- | pregna-1,4-dien-11β-ol-3,20-dione

16α,17α,21-triacetoxypregna-1,4-dien-11β-ol-3,20-dione

17α-acetoxypregna-1,4-diene-11β,21-diol-3,21-dione

17α,21-diacetoxypregna-1,4-dien-11β-ol-3,20-dione

16β-methyl-17α-acetoxypregna-1,4-diene-11β,21-diol-3,20-dione

16β-methyl-17α,21-diacetoxypregna-1,4-dien-11β-ol-3,20-dione

17α-acetoxypregn-4-ene-11β,21-diol-3,20-dione

17α,21-diacetoxypregn-4-en-11β-ol-3,20-dione

6α,21-difluoro-16α,17α-isopropylidenedioxypregn-4-en-11β-ol-3,20-dione

6α-chloro-16α,17α-isopropylidenedioxy-21-acetoxypregna-1,4,6-trien-11β-ol-3,20-dione 6α,21-dichloro-16α,17α-isopropylidenedioxypregna-1,4,6-triene-11β-ol-3,20-dione 6α-fluoro-16α-methyl-17α-acetoxy-21-trimethylacetoxypregna-1,4-dien-11β-ol-3,20-dione 17α,21-diacetoxypregna-1,4-diene-3,20-dione 9α,11β-dichloro-16α,17α,21-triacetoxypregna-1,4-diene-3,20-dione 9α,11β,21-trichloro-17α-acetoxypregna-1,4-diene-3,20-dione 9α,11β-dichloro-17α,21-diacetoxypregna-1,4-diene-3,20-dione 9α,11β,21-trichloro-16β-methyl-17α-acetoxypregna-1,4-diene-3,20-dione 9α,11β-dichloro-16β-methyl-17α,21-diacetoxypregna-1,4-diene-3,20-dione 9α,11β,21-trichloro-17α-acetoxypregn-4-ene-3,20-dione 9α,11β-dichloro-17α,21-diacetoxypregn-4-ene-3,20-dione 6α,21-difluoro-9α,11β-dichloro-16α,17α-isopropylidenedioxypregn-4-ene-3,20-dione 6α,9α,11β-trichloro-16α,17α-isopropylidenedioxy-21-acetoxypregna-1,4,6-triene-3,20-dione 6α9α,11β,21-tetrachloro-16α,17α-isopropylidenedioxypregna-1,4,6-triene-3,20-dione 6α-fluoro-9α,11β-dichloro-16α-methyl-17α-acetoxy-21-trimethylacetoxypregna-1,4-diene-3,20-dione The following procedures illustrate the manner by which C-16 and/or C-21 ester can be hydrolyzed so as to prepare the free hydroxy compounds and the manner by which Δ⁶ unsaturation can be introduced, each after the principal reaction hereof:

A solution of 0.17 g. of potassium hydroxide in 0.2 ml. of water and 2.5 ml. of methanol is added to a solution of 1 g. of 6α-fluoro-9α,11β-dichloro-16α,17α-isopropylidenedioxy-21-acetoxypregna-1,4-diene-3,20-dione in 30 ml. of methanol under nitrogen. The solution is allowed to stand for 2 hours at 20° C., cooled, neutralized with acetic acid and concentrated under reduced pressure. After the addition of water, the solid which forms is collected by filtration and dried to yield 6α-fluoro-9α,11β-dichloro-16α,17α-isopropylidenedioxypregna-1,4-dien-21-ol-3,20-dione which is recrystallized from acetone:hexane.

A mixture of 1 g. of 6α-fluoro-9α,11β-dichloro-16α,17α-isopropylidenedioxypregna-1,4-dien-21-ol-3,20-dione, 2 g. of chloranil, 15 ml. of ethyl acetate and 5 ml. of acetic acid is refluxed under nitrogen for 96 hours. The mixture is then cooled and washed with cold 10 percent aqueous sodium hydroxide until the washings were colorless. The organic solution is dried over sodium sulfate and the ethyl acetate removed by evaporation. Upon chromatography of the residue on neutral alumina there is obtained 6α-fluoro-9α,11β-di-chloro-16α,17α-isopropylidenedioxypregna-1,4,6-triene-3,20-dione which may be further purified by recrystallization from acetone:hexane.

In accordance with the foregoing methods, the following compounds are prepared:

6β-methyl-6α,7α-difluoromethylene-9α,11β-dichloro-16α,17α-isopropylidenedioxypregna-1,4-diene-21-ol-3,20-dione, 6β,9α,11β-trichloro-6α,7α-difluoromethylene-16α-methylpregna-1,4-diene-17α,21-diol-3,20-dione, 6β,21-difluoro-6α,7α-difluoromethylene-9α,11β-dichloro-16α,17α-isopropylidenedioxypregna-1,4-diene-3,20-dione, 6α,7α-methylene-9α,11β-dichloro-21-fluoropregn-4-ene-17α-ol-3,20-dione, 6,6-difluoro-9α,11β-dichloro-16α-methylpregna-1,4-diene-17α,21-diol-3,20-dione, 6,6-difluoro-9α,11β-dichloro-16α,17α-isopropylidenedioxypregna-1,4-diene-21-ol-3,20-dione, 6,6-difluoro-9α,11β-dichloro-16α,17α-cyclohexylidenedioxypregna-1,4-dien-21-ol-3,20-dione, 6,6-difluoro-9α,11β-dichloro-16α,17α-benzylidenedioxypregna-1,4-dien-21-ol-3,20-dione, and 6,6-difluoro-9α,11β-dichloro-16α,17α-methylphenylmethylenedioxypregna-1,4-dien-21-ol-3,20-dione.

What is claimed is:

1. The process useful for preparing a 9α,11β-dichloro steroid of the pregnane series which consists essentially of the step of reacting the corresponding 9α-unsubstituted-11β-hydroxy steroid with sulfuryl chloride.

2. The process according to claim 1 conducted in inert liquid reaction media.

3. The process according to claim 2 conducted in the presence of tertiary amine.

4. The process according to claim 3 conducted at from about −10° C. to about 30° C.

5. The process according to claim 3 wherein there is prepared a compound selected from those represented by the following formula:

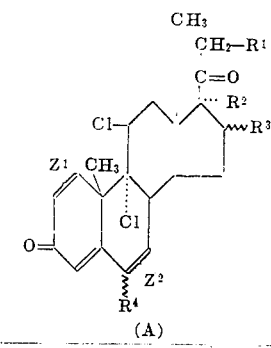

(A)

wherein R¹ is hydroxy or the conventional hydrolyzable esters thereof, bromo, chloro or fluoro;

R² is hydroxy or the conventional hydrolyzable esters thereof;

R³ is α-methyl, β-methyl, methylene, hydroxy or the conventional hydrolyzable esters thereof, or, when taken together with R², the group

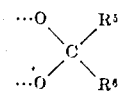

in which each of R⁵ and R⁶ are hydrogen, lower alkyl, monocyclic cycloalkyl or monocyclic aryl;

R⁴ is hydrogen, methyl, chloro or fluoro; and each of Z¹ and Z² is a carbon-carbon single bond or a carbon-carbon double bond.

6. The process according to claim 3 wherein 6α-fluoro-9α,11β-dichloro-16α,17α-isopropylidenedioxypregna-1,4-dien-21-ol-3,20-dione is prepared.

7. The process according to claim 3 wherein 6α,21-difluoro-9α,11β-dichloro-16α,17α-isopropylidenedioxypregna-1,4-diene-3,20-dione is prepared.

8. The process according to claim 3 wherein 6α-fluoro-9α,11β,21-trichloro-16α,17α-isopropylidenedioxypregna-1,4-diene-3,20-dione is prepared.

9. The process according to claim 2 wherein the inert liquid reaction media is a chlorinated hydrocarbon.

10. The process according to claim 2 wherein said 9α-unsubstituted-11β-hydroxy steroid and said sulfuryl chloride are employed in substantially equal molar amounts.

* * * * *